(12) United States Patent
Hornung et al.

(10) Patent No.: US 11,353,100 B2
(45) Date of Patent: Jun. 7, 2022

(54) DIFFERENTIAL GEAR FOR A MOTOR VEHICLE

(71) Applicant: AUDI AG, Ingolstadt (DE)

(72) Inventors: Kurt Hornung, Forchheim (DE); Markus Schäfer, Ottobrunn (DE); Andrej Merz, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/286,136

(22) PCT Filed: Oct. 31, 2019

(86) PCT No.: PCT/EP2019/079789
§ 371 (c)(1),
(2) Date: Apr. 16, 2021

(87) PCT Pub. No.: WO2020/104165
PCT Pub. Date: May 28, 2020

(65) Prior Publication Data
US 2021/0356028 A1 Nov. 18, 2021

(30) Foreign Application Priority Data
Nov. 22, 2018 (DE) ...................... 10 2018 220 105.6

(51) Int. Cl.
*F16H 48/40* (2012.01)
*F16H 48/38* (2012.01)

(52) U.S. Cl.
CPC ....... *F16H 48/40* (2013.01); *F16H 2048/382* (2013.01); *F16H 2048/385* (2013.01)

(58) Field of Classification Search
CPC ................... F16C 2226/10–12; F16C 2240/46
See application file for complete search history.

(56) References Cited

U.S. PATENT DOCUMENTS

| 6,193,137 B1* | 2/2001 | Ezumi | B23K 20/122 228/112.1 |
| 8,710,393 B2* | 4/2014 | Okumura | B23K 33/006 219/78.16 |

(Continued)

FOREIGN PATENT DOCUMENTS

| DE | 100 30 901 A1 | 1/2002 |
| DE | 10 2008 057 370 A1 | 5/2010 |

(Continued)

OTHER PUBLICATIONS (Book); Erik Oberg, Franklin D. Jones, Holbrook L. Horton, and Henry H. Ryffel; "27th Edition Machinery's Handbook"; Industrial Press Inc.; pp. 656-657 and 663-664 (Year: 2004).*

(Continued)

*Primary Examiner* — Ernesto A Suarez
*Assistant Examiner* — James J Taylor, II
(74) *Attorney, Agent, or Firm* — Maier & Maier, PLLC

(57) ABSTRACT

A differential gear including a rotatably mounted differential housing and a final driven gear mounted rotationally fixed to the differential housing. The differential housing, on the outer circumferential surface thereof, includes two mating surfaces and that the final driven gear, on the inner circumferential surface thereof, includes two radially opposite mating surfaces. The mating surfaces formed on the outer circumferential surface of the differential housing and the mating surfaces formed on the inner circumferential surface of the final driven gear are each designed as separate mating surfaces which, when viewed in axial direction (a), are arranged geometrically separated from each other by a spacing.

20 Claims, 3 Drawing Sheets

(56) References Cited

U.S. PATENT DOCUMENTS

| | | | | |
|---|---|---|---|---|
| 8,876,649 | B2* | 11/2014 | Uchida | F16H 48/38 |
| | | | | 475/220 |
| 9,239,104 | B2* | 1/2016 | Uchida | B32B 3/06 |
| 9,933,061 | B2* | 4/2018 | Shirakawa | B23K 15/04 |
| 10,125,855 | B2* | 11/2018 | Yanase | F16H 48/40 |
| 2005/0090358 | A1 | 4/2005 | Phelan et al. | |
| 2012/0329599 | A1 | 12/2012 | Taniguchi et al. | |
| 2016/0229009 | A1* | 8/2016 | Klein-Hitpass | F16H 55/17 |
| 2016/0377161 | A1 | 12/2016 | Hornung | |
| 2017/0219077 | A1 | 8/2017 | Edler | |

FOREIGN PATENT DOCUMENTS

| | | |
|---|---|---|
| DE | 10 2011 080 002 A1 | 1/2013 |
| DE | 10 2011 087 579 A1 | 6/2013 |
| DE | 10 2016 218 087 A1 | 3/2017 |
| DE | 10 2017 006 417 A1 | 2/2018 |
| EP | 2 740 562 B1 | 12/2016 |
| FR | 2 805 482 A1 | 8/2001 |
| JP | 2013096550 A * 5/2013 | F16H 1/32 |
| WO | WO-2011158330 A1 * 12/2011 | G01N 29/041 |
| WO | 2014/086353 A1 6/2014 | |
| WO | 2017/050375 A1 3/2017 | |

OTHER PUBLICATIONS

Examination Report dated Sep. 19, 2019 in corresponding German application No. 10 2018 220 105.6; 18 pages including Machine-generated English-language translation.

International Search Report dated Feb. 4, 2020 in corresponding International application No. PCT/EP2019/079789; 5 pages.

Written Opinion of the International Searching Authority dated Feb. 4, 2020 in corresponding International application No. PCT/EP2019/079789; 14 pages including Machine-generated English-language translation.

Notification of Transmittal of Translation of the International Preliminary Report on Patentability dated Jun. 3, 2021, in connection with corresponding International Application No. PCT/EP2019/079789; 8 pages.

* cited by examiner

DIFFERENTIAL GEAR FOR A MOTOR VEHICLE

FIELD

The disclosure relates to a differential gear for a motor vehicle.

BACKGROUND

Differential gears as well as different designs for the support of the final driven gear on the differential housing are sufficiently known from the prior art. Merely as examples, reference is made to EP 2740562 B1, DE 102017006417 A1 and DE 102016218087 A1. In particular, the axial forces introduced via the toothing of the final driven gear can lead to a "tilting" and thus to a shifting of the toothing, which in turn results in a more unfavorable tooth contact and thus a non-uniform transmission of motion (rotational speed, torque). Non-uniform transmission of motion results in acoustic abnormalities, which in turn can trigger vehicle complaints. In particular, with a view to new vehicle designs comprising an electric drive, these acoustic complaints take on more and more importance.

SUMMARY

The underlying problem of the disclosure is to improve a differential gear so that undesired shifting of the toothing is prevented and thus the risk of the occurrence of acoustic abnormalities during operation is reduced.

In a known manner, the differential gear comprises a rotatably mounted differential housing as well as a final driven gear comprising outer toothing, which is mounted rotationally fixed to the differential housing and which in turn meshes via the outer toothing thereof with an associated drive shaft.

According to the invention, the differential housing, on the outer circumferential surface thereof, comprises two mating surfaces and the final driven gear, on the inner circumferential surface thereof, comprises corresponding radially opposite mating surfaces. It is only for the sake of completeness that it is pointed out that the mating surfaces formed on the differential housing and that the mating surfaces formed on the final driven gear are designed as circumferential mating surfaces. Moreover, according to the invention, the mating surfaces formed on the outer circumferential surface of the differential housing and the mating surfaces formed on the inner circumferential surface of the final driven gear here are each designed as separate mating surfaces which, when viewed in axial direction, are arranged geometrically separated from each other by a spacing A, and that the final driven gear is pressed onto the differential housing, so that the final driven gear and the differential housing are connected to one another by means of a first press fit and a second press fit which is separate therefrom and axially separated by the spacing A.

The design according to the invention has the effect that, due to the two separate press fits which are axially separated by the spacing A, an exceedingly tilt-resistant support is provided. Thereby, in an advantageous manner, it is ensured that all forces resulting from the toothing can be absorbed by means of the tilt-resistant support according to the invention. The tendency to tilt is considerably reduced thereby, with the consequence that an optimal tooth contact and thus a uniform transmission of motion causing no undesired noise is ensured.

Preferably, here, when viewed in axial direction, the mating surfaces formed on the outer circumferential surface of the differential housing as well as the mating surfaces formed on the inner circumferential surface of the final driven gear are in each case separated from one another by a circumferential groove introduced into the respective circumferential surface, wherein the grooves, when viewed in axial direction, each have a length corresponding to the spacing A. By means of the groove, an easily achieved effective geometric separation of the mating surfaces and thus of the press fit is ensured. Another advantage is that the material removal caused by the groove has a positive effect on the component weight, so that a particularly weight-optimized construction is made possible. By corresponding dimensioning of the groove depth, an influence on the material removal and thus on the weight savings can be achieved in a simple manner.

Preferably, the grooves here have a rectangular, triangular or semi-circular basic shape.

So that a sufficiently tilt-resistant support can be ensured, the spacing A between the mating surfaces should be as large as possible. Initial tests have shown that the desired effect, namely the tilt-resistant support, is ensured if $$0.5 \leq A/L \leq 0.7,$$

wherein L denotes the axial length, when viewed in axial direction, of the inner circumferential surface of the final driven gear.

A first embodiment of the differential gear according to the invention is characterized in that the two press fits have a small radial overlap of 10 to 50 μm and that, between the final driven gear and the differential housing, an additional non positive or positive locking connection is formed. In this embodiment, it is advantageous that, due to the relatively small radial overlap, the two components are easy to join, and moreover—due to the additional non positive and positive locking connection—a high torque transmission is ensured.

According to a first design of the first embodiment, the additional connection is designed in the form of a weld connection. In addition to a rapid, simple and thus cost effective production, this moreover also ensures that additional axial securing is not necessary.

In order to achieve an additional savings in component weight, the weld connection is preferably designed as a one-sided circumferential weld seam position which is arranged only in the region of the first press fit or in the region of the second press fit.

Preferably, the weld connection is produced by electron or laser welding.

According to a second design of the first embodiment, the additional connection is designed in the form of a polygonal or tight-mating toothing, wherein, between final driven gear and differential housing, a retaining element preventing a relative movement in axial direction is arranged. An advantage of the second design is that, due to the positive locking connection, it has a low component weight in comparison to the first design.

Here, the retaining element is preferably designed in the form of a retaining ring, in particular in the form of a tapered retaining ring.

An alternative second embodiment of the toothed support according to the invention is characterized in that the two press fits have a radial overlap of >200 μm and in that the final driven gear is connected in a rotationally and axially fixed manner to the differential housing only via the frictional connections resulting from the two press fits. Thereby, advantageously, a particularly weight-optimized design is provided.

Preferably, the differential housing is made of cast iron and the final driven gear is made of a hardenable material.

BRIEF DESCRIPTION OF THE DRAWINGS

Additional advantages and application possibilities of the present disclosure result from the following description in connection with the embodiment example represented in the drawings.

In the drawings.

DETAILED DESCRIPTION

Figure 1:
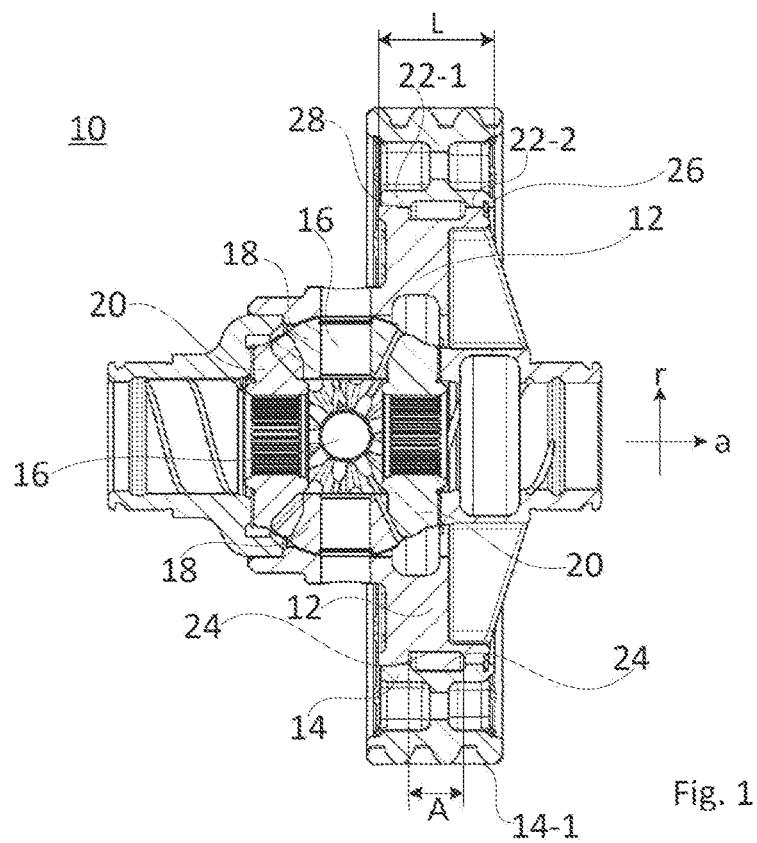
FIG. 1 represents a cross-sectional view of a first embodiment of a differential gear according to the invention.

In the following description and in the figures, identical parts and components are marked with identical reference numerals to avoid repetitions, to the extent that no additional differentiation is necessary or appropriate.

Figure 2:
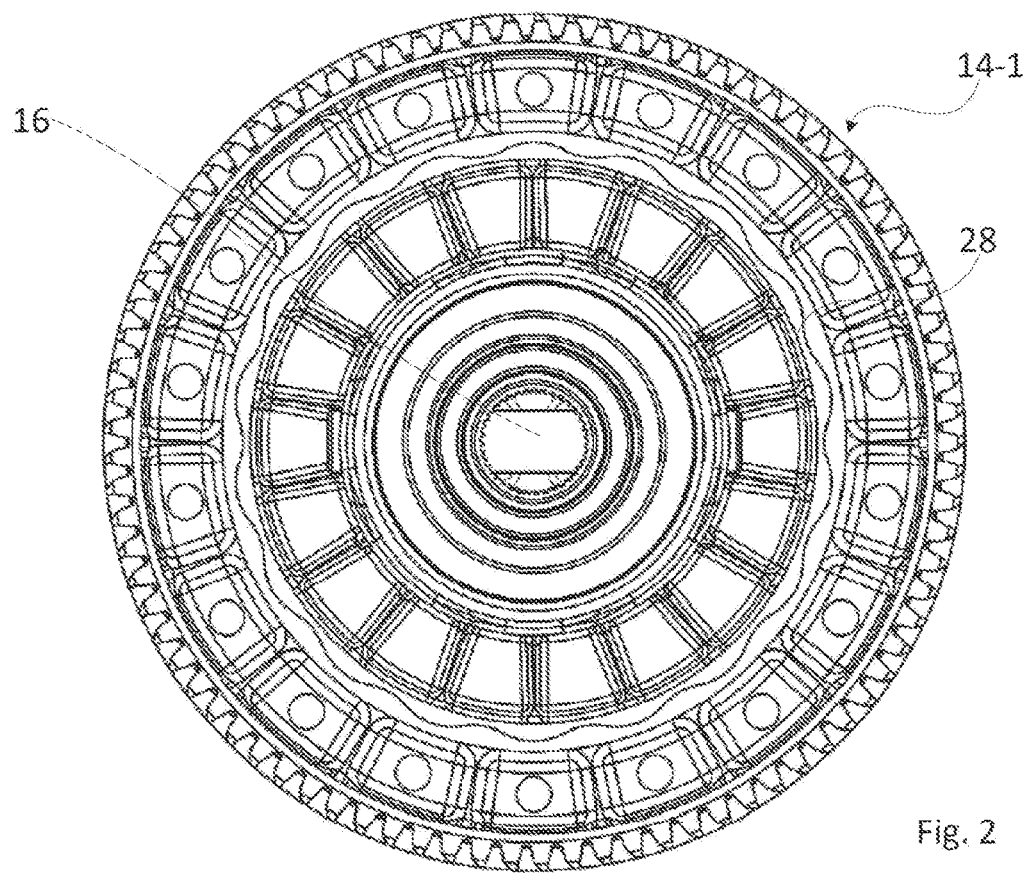
FIG. 2 represents the differential gear from FIG. 1 in the top view.

FIGS. 1 and 2 show a first embodiment of a differential gear of a motor vehicle, denoted overall by the reference numeral 10.

The differential gear 10 comprises a differential housing 12 and an final driven gear 14 connected in a rotationally fixed manner to the differential housing 12. The final driven gear 14, via the outer toothing 14-1 thereof, is in operative connection with a drive shaft—not represented here the sake of clarity.

Via a cruciform drive pin 16, the differential housing 12 drives four planet gears 18 which in turn mesh with two driven gears 20 which can be connected in a rotationally fixed manner to wheel shaft axles—not represented here for the sake of clarity.

As can be derived from FIGS. 1 and 2, the differential housing 12, on the outer circumferential surface thereof, has two mating surfaces, and the final driven gear 14, on the inner circumferential surface thereof, has two radially opposite mating surfaces which, when viewed in axial direction a, are each formed as separate mating surfaces arranged geometrically separated from one another by a spacing A, so that the final driven gear 14 pressed onto the differential housing 12 is connected collectively by means of a first press fit 22-1 and a second press fit 22-2 which is separate therefrom and axially separated by the spacing A.

In order to ensure a sufficient spacing for the tilt-resistant support between the press fits 22-1 and 22-2, the spacing A should be selected so that:

$$0.5 \leq A/L \leq 0.7,$$

wherein L denotes the axial length, when viewed in axial direction a, of the inner circumferential surface of the final driven gear 14.

For the geometric separation of the mating surfaces and thus of the first and second press fits 22-1, 22-2—as can also be derived from FIG. 1—, a groove 24 is milled in each case into the circumferential surface of the differential housing 12 and into the circumferential surface of the final driven gear 14. In addition to the geometric separation, a weight reduction is also achieved in particular in a particularly advantageous manner by the grooves 24.

In the present case, the grooves 24 that are introduced each have a substantially rectangular basic shape.

Due to the spaced arrangement, in axial direction a, of the two press fits 22-1, 22-2, an exceedingly tilt-resistant support is provided, which can absorb all the axial forces resulting from the meshing of the outer toothing 14-1 of the final driven gear 14 with a drive shaft—not represented here—, so that an optimal tooth contact and thus a uniform transmission of motion causing no undesired noise is ensured.

According to the embodiment represented in FIG. 1 and FIG. 2, the two press fits 22-1 and 22-2 have a radial overlap of 10 to 50 μm. Moreover, in order to ensure the torque transmission, between final driven gear 14 and differential housing 12, in the area of the first press fit 22-1, an additional positive locking connection is formed. The axial securing is ensured via a retaining ring 26.

As can be seen in particular from FIG. 2, in the present case, the positive locking connection is designed in the form of a polygonal toothing 28.

Figure 3:
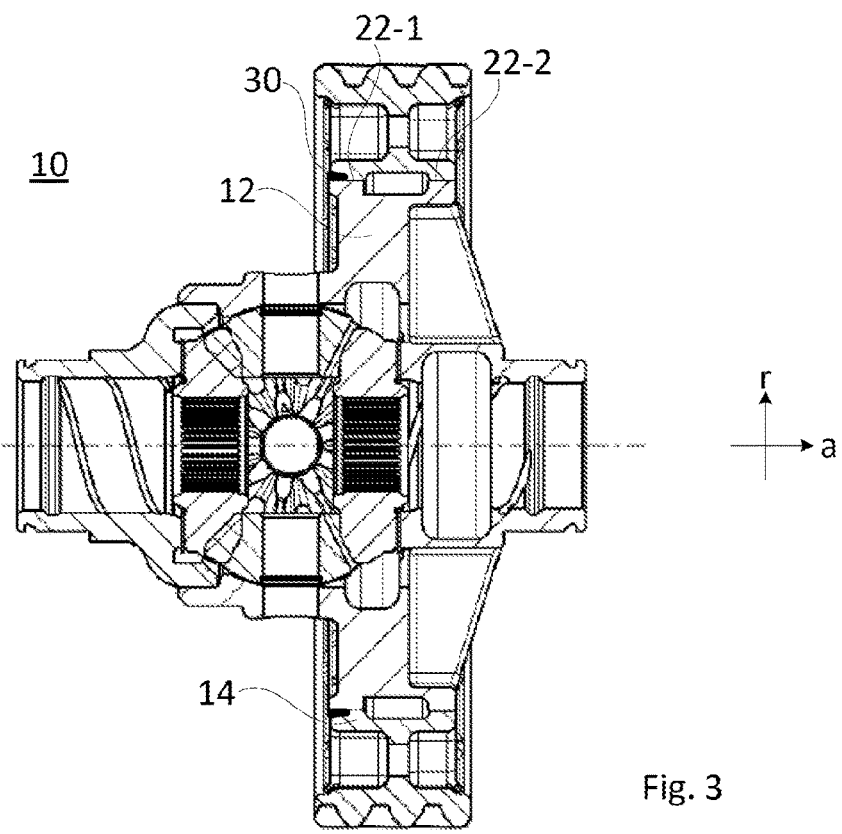
FIG. 3 represents a second embodiment of a differential gear in a cross-sectional view.
Figure 4:
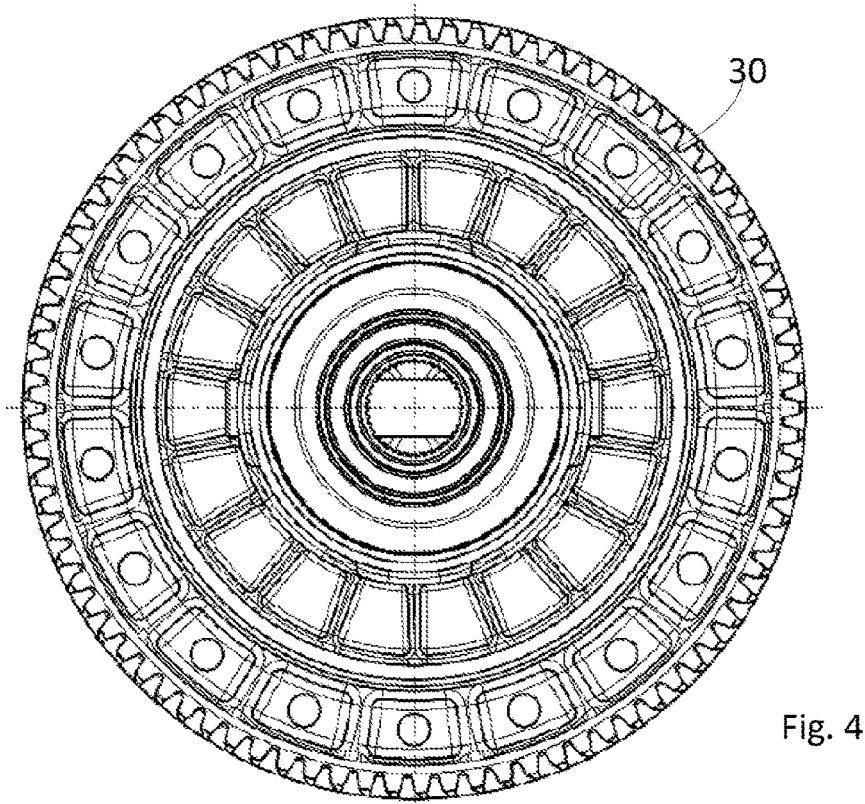
FIG. 4 represents the differential gear from FIG. 3 in the top view.

The second embodiment represented in FIGS. 3 and 4 corresponds substantially to the first embodiment represented in FIGS. 1 and 2. Compared to the first embodiment, the second embodiment differs in that the additional connection between final driven gear 14 and differential housing 12, which is used for the torque transmission, is designed in the form of a weld connection 30. Here—as FIGS. 3 and 4 show in particular—the weld connection 30 is designed as a one-sided circumferential weld seam position which is arranged only in the region of the first press fit 22-1. In addition to the torque transmission, an axial securing is also ensured by the weld seam.

Figure 5:
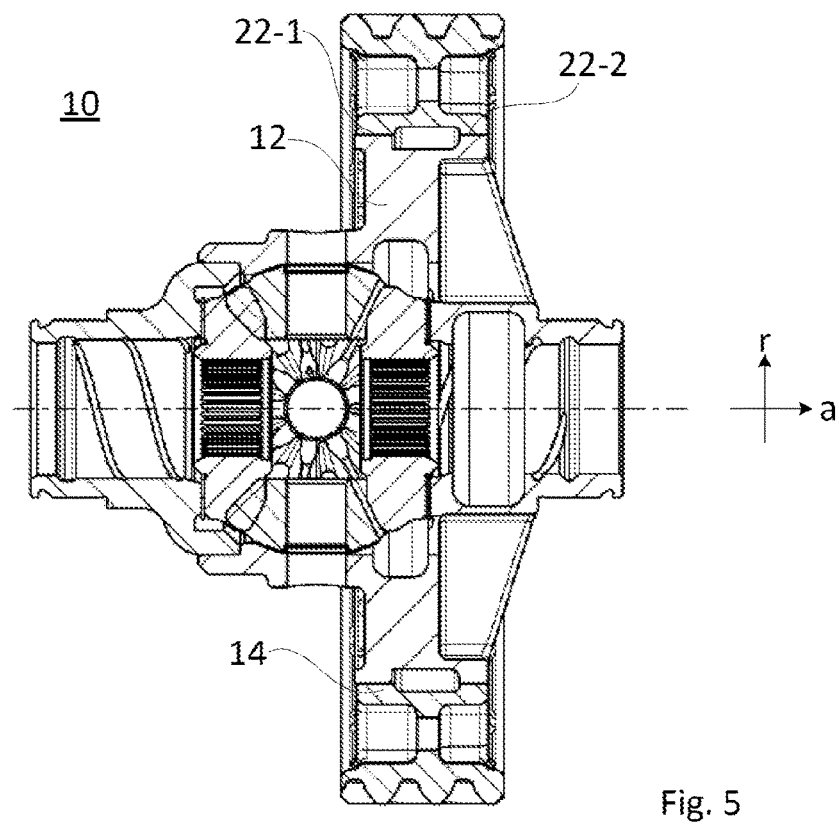
FIG. 5 represents a cross-sectional view of a third embodiment of the differential gear according to the invention.
Figure 6:
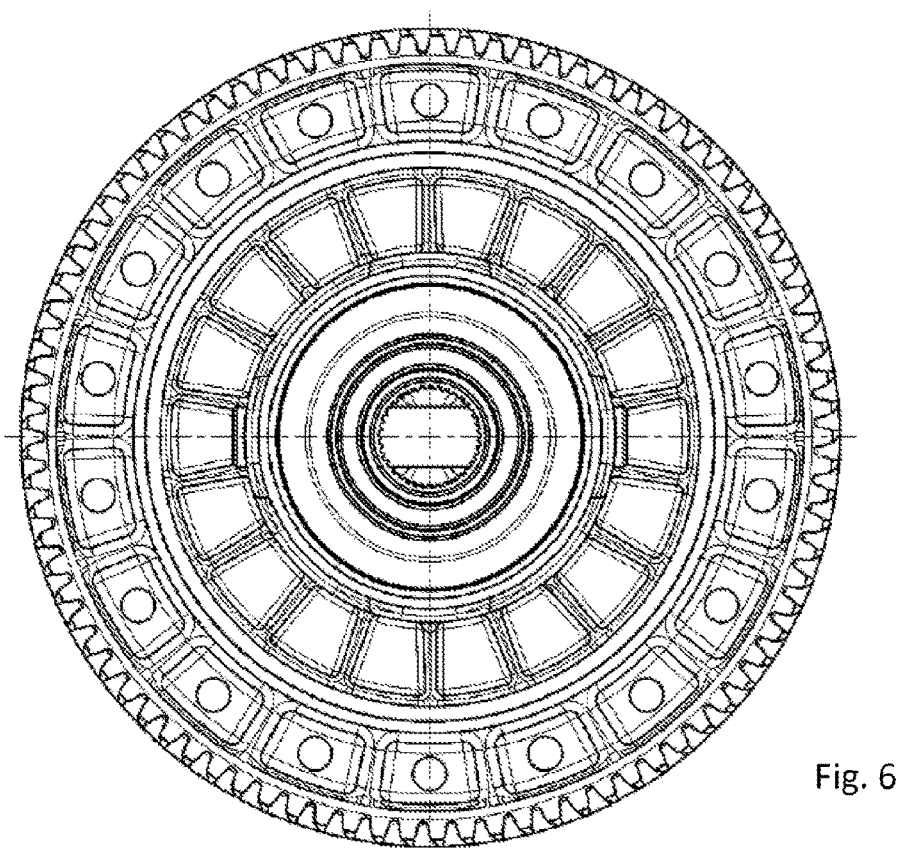
FIG. 6 represents the differential gear from FIG. 5 in the top view.

The third embodiment of the differential housing according to the invention, which is represented in FIGS. 5 and 6, in comparison to the first and second embodiments, is characterized in that, for the torque transmission, instead of a positive or non positive locking connection, here only a frictional connection is provided. In order to ensure a sufficient torque transmission, the two press fits 22-1, 22-2 here have a radial overlap of >200 μm.

The invention claimed is:

1. A differential gear comprising a rotatably mounted differential housing and a final driven gear mounted rotationally fixed to the differential housing, wherein the differential housing, on an outer circumferential surface thereof, comprises two mating surfaces, wherein the final driven gear, on an inner circumferential surface thereof, comprises two radially opposite mating surfaces, wherein the mating surfaces formed on the outer circumferential surface of the differential housing and the mating surfaces formed on the inner circumferential surface of the final driven gear are each designed as separate mating surfaces which, when viewed in an axial direction (a), are arranged geometrically separated from each other by a spacing (A) and are located at a same radial distance from a rotational axis of the differential housing, wherein the final driven gear is pressed onto the differential housing, so that the final driven gear and the differential housing are connected to one another by means of a first press fit and a second press fit which is separate therefrom and axially separated by the spacing (A), and wherein at least one of the first press fit and second press fit is provided only as a frictional connection.

2. The differential gear according to claim 1, wherein in the axial direction (a), the mating surfaces formed on the outer circumferential surface of the differential housing and the mating surfaces formed on the inner circumferential surface of the final driven gear are in each case separated from one another by a circumferential groove introduced into each respective circumferential surface, and wherein the grooves, when viewed in the axial direction (a), each have a length corresponding to the spacing (A).

3. The differential gear according to claim 2, wherein the grooves have a rectangular, triangular or semicircular basic shape.

4. The differential gear according to claim 3, wherein when viewed in the axial direction (a), the inner circumferential surface of the final driven gear has a length (L) and wherein, with respect to the length (L) of the inner circumferential surface, for the spacing (A) between the mating surfaces:

$0.5 \leq A/L \leq 0.7$.

5. The differential gear according to claim 3, wherein the two press fits have a radial overlap of 10 to 50 μm and wherein an additional non positive or positive locking connection is formed between the final driven gear and the differential housing.

6. The differential gear according to claim 3, wherein the two press fits have a radial overlap of >200 μm, so that the final driven gear is connected in a rotationally fixed and axially fixed manner to the differential housing only via frictional connections resulting from the two press fits.

7. The differential gear according to claim 2, wherein when viewed in the axial direction (a), the inner circumferential surface of the final driven gear has a length (L) and wherein, with respect to the length (L) of the inner circumferential surface, for the spacing (A) between the mating surfaces:

$0.5 \leq A/L \leq 0.7$.

8. The differential gear according to claim 2, wherein the two press fits have a radial overlap of 10 to 50 μm and wherein an additional non positive or positive locking connection is formed between the final driven gear and the differential housing.

9. The differential gear according to claim 2, wherein the two press fits have a radial overlap of >200 μm, so that the final driven gear is connected in a rotationally fixed and axially fixed manner to the differential housing only via frictional connections resulting from the two press fits.

10. The differential gear according to claim 1, wherein when viewed in the axial direction (a), the inner circumferential surface of the final driven gear has a length (L) and wherein, with respect to the length (L) of the inner circumferential surface, for the spacing (A) between the mating surfaces:

$0.5 \leq A/L \leq 0.7$.

11. The differential gear according to claim 10, wherein the two press fits have a radial overlap of 10 to 50 μm and wherein an additional non positive or positive locking connection is formed between the final driven gear and the differential housing.

12. The differential gear according to claim 1, wherein the two press fits have a radial overlap of 10 to 50 μm and wherein an additional non positive or positive locking connection is formed between the final driven gear and the differential housing.

13. The differential gear according to claim 12, wherein the additional connection is designed in the form of a weld connection.

14. The differential gear according to claim 13, wherein the weld connection is designed as a one-sided weld seam position arranged either only in a region of the first press fit or only in a region of the second press fit.

15. The differential gear according to claim 14, wherein the weld connection is produced by electron or laser welding.

16. The differential gear according to claim 13, wherein the weld connection is produced by electron or laser welding.

17. The differential gear according to claim 12, wherein the additional connection is designed in the form of a polygonal or mating toothing and wherein, between the final driven gear and the differential housing, a retaining element preventing a relative movement in the axial direction (a) is arranged.

18. The differential gear according to claim 17, wherein the retaining element is designed in the form of a retaining ring.

19. The differential gear according to claim 1, wherein the two press fits have a radial overlap of >200 μm, so that the final driven gear is connected in a rotationally fixed and axially fixed manner to the differential housing only via frictional connections resulting from the two press fits.

20. The differential gear according to claim 1, wherein the differential housing is made of cast iron and the final driven gear is made of a hardenable material.

* * * * *